US011305743B2

(12) United States Patent
Michels et al.

(10) Patent No.: US 11,305,743 B2
(45) Date of Patent: Apr. 19, 2022

(54) HYDRAULIC MOTOR VEHICLE BRAKE SYSTEMS AND A CONTROL DEVICE SYSTEM THEREFOR, METHODS FOR OPERATING HYDRAULIC MOTOR VEHICLE BRAKE SYSTEMS AND COMPUTER PROGRAM FOR CARRYING OUT THE METHODS

(71) Applicant: ZF Active Safety GmbH, Koblenz (DE)

(72) Inventors: Erwin Michels, Kail (DE); Benedikt Ohlig, Vallendar (DE); Matthias Fuchs, Koblenz (DE)

(73) Assignee: ZF Active Safety GmbH, Koblenz (DE)

( * ) Notice: Subject to any disclaimer, the term of this patent is extended or adjusted under 35 U.S.C. 154(b) by 248 days.

(21) Appl. No.: 16/603,765

(22) PCT Filed: Mar. 19, 2018

(86) PCT No.: PCT/EP2018/056834
§ 371 (c)(1),
(2) Date: Oct. 8, 2019

(87) PCT Pub. No.: WO2018/188900
PCT Pub. Date: Oct. 18, 2018

(65) Prior Publication Data
US 2020/0114888 A1 Apr. 16, 2020

(30) Foreign Application Priority Data
Apr. 13, 2017 (DE) .......................... 102017003654.3

(51) Int. Cl.
B60T 8/1755 (2006.01)
G05D 1/02 (2020.01)

(52) U.S. Cl.
CPC .......... *B60T 8/17558* (2013.01); *G05D 1/021* (2013.01); *B60T 2270/402* (2013.01); *B60T 2270/404* (2013.01)

(58) Field of Classification Search
CPC ........... B60T 8/17558; B60T 2270/402; B60T 2270/404; B60T 17/221; B60T 7/12;
(Continued)

(56) References Cited

U.S. PATENT DOCUMENTS

2016/0009267 A1* 1/2016 Lesinski, Jr. ............. B60T 7/12
303/10
2017/0072920 A1* 3/2017 Besier ....................... B60T 7/22

FOREIGN PATENT DOCUMENTS

DE 102005036827 A1 2/2007
DE 102008037666 A1 3/2009
(Continued)

*Primary Examiner* — Rachid Bendidi
*Assistant Examiner* — Andrew J Cromer
(74) *Attorney, Agent, or Firm* — Robert James Harwood

(57) ABSTRACT

A hydraulic motor vehicle brake system comprises a vehicle dynamic control system which comprises a first brake circuit which acts on at least one first wheel brake, and a second brake circuit which acts on at least one second wheel brake, the first brake circuit comprising a first hydraulic pressure generator and the second brake circuit comprising a second hydraulic pressure generator, which can be actuated electrically for control interventions. Furthermore, the hydraulic motor vehicle brake system comprises an electrically actuable third hydraulic pressure generator, and a controller which is configured to detect failure of at least one of the two brake circuits and a requirement of a control intervention on the at least one brake circuit, to actuate at least the third hydraulic pressure generator for assisting the control intervention.

20 Claims, 5 Drawing Sheets

(58) Field of Classification Search
CPC .......... B60T 8/326; B60T 8/885; B60T 13/66; B60T 7/22; B60T 8/321; G05D 1/021
See application file for complete search history.

(56) References Cited

FOREIGN PATENT DOCUMENTS

| | | |
|---|---|---|
| DE | 102014214378 A1 | 1/2016 |
| DE | 102014221682 A1 | 4/2016 |
| EP | 2977282 A1 | 1/2016 |
| WO | 2015106892 A1 | 7/2015 |
| WO | 2015173134 A1 | 11/2015 |
| WO | 2016000865 A1 | 1/2016 |

\* cited by examiner

HYDRAULIC MOTOR VEHICLE BRAKE SYSTEMS AND A CONTROL DEVICE SYSTEM THEREFOR, METHODS FOR OPERATING HYDRAULIC MOTOR VEHICLE BRAKE SYSTEMS AND COMPUTER PROGRAM FOR CARRYING OUT THE METHODS

CROSS-REFERENCE TO RELATED APPLICATION

This application is a national stage of International Application No. PCT/EP2018/058834, filed Mar. 19, 2018, the disclosure of which is incorporated herein by reference in its entirety, and which claimed priority to German Patent Application No. 102017003654.3, filed 13 Apr. 2017, the disclosure of which is incorporated herein by reference in its entirety.

TECHNICAL FIELD

The present disclosure relates generally to the field of motor vehicle brake systems. Specifically, a hydraulic motor vehicle brake system and a control unit system therefore are described.

BACKGROUND

Known hydraulic motor vehicle brake systems, which are configured as a Brake-By-Wire (BBW) system or are equipped with an Electric Brake Boost (EBB) system, comprise an electrically actuable hydraulic pressure generator which, during normal braking operation, generates hydraulic pressure at wheel brakes of motor vehicle or boosts hydraulic pressure which is generated by a driver. To this end, a vehicle deceleration which is a result of the driver pressing a brake pedal, is detected by a sensor and is converted into an actuating signal for the electrically actuable hydraulic pressure generator.

Brake systems of this type, as a rule, also comprise a master cylinder which can be actuated mechanically by means of the brake pedal and via which hydraulic fluid can likewise be conveyed to the wheel brakes. The master cylinder which can be actuated by means of the brake pedal provides redundancy in relation to the electrically actuable hydraulic pressure generator of the BBW or EBB system, which is indispensable for reasons of operational safety.

Motor vehicle brake systems for autonomous or semi-autonomous driving also need to have redundancy in design. It cannot be assumed in such cases, however, that the driver is situated in the vehicle (for example, in a remote controlled parking (RCP) operation), or that the driver can actuate a brake pedal promptly (for example, in the case of said driver not looking at what is happening on the road). For this reason, it is required that, in addition to a functional unit which provides an electrically actuable brake master function, brake systems for autonomous or semi-autonomous driving also comprise a further functional unit which implements an electrically actuable auxiliary braking function in a redundant way.

SUMMARY

The present disclosure is based on the object of specifying a hydraulic motor vehicle brake system which has improved redundancy.

In accordance with a first aspect, a hydraulic motor vehicle brake system is specified. The hydraulic motor vehicle brake system comprises a vehicle dynamic control (Electronic Stability Control, ESC) system which is of dual-circuit configuration and which comprises a first brake circuit which acts on one or more first wheel brakes, and a second brake circuit which acts on one or more second wheel brakes, the first brake circuit comprising a first hydraulic pressure generator which can be actuated electrically for control interventions, and the second brake circuit comprising a second hydraulic pressure generator which can be actuated electrically for control interventions, and which can be actuated independently of the first hydraulic pressure generator. Furthermore, the hydraulic motor vehicle brake system comprises an electric parking brake (EPS) system with an electrically actuable first actuator which is assigned to one of the first wheel brakes, and an electrically actuable second actuator which is assigned to one of the second wheel brakes. Furthermore, the hydraulic motor vehicle brake system comprises a controller which is configured to detect a functional loss of at least one of the two brake circuits and a requirement of a control intervention on the at least one brake circuit which is affected by the functional loss, and, if the functional loss and the requirement of a control intervention are detected, to actuate at least one of the actuators for carrying out or assisting the control intervention.

Furthermore, the hydraulic motor vehicle brake system in accordance with the first aspect may comprise an electrically actuable third hydraulic pressure generator which is configured to generate a hydraulic pressure for at least one of the two brake circuits. In this case, the controller can be configured to actuate the third hydraulic pressure generator, if the functional loss and the requirement of a control intervention are detected, in order to carry out or assist the control intervention.

Carrying out the control intervention can take place exclusively by means of the at least one actuated actuator. As an alternative to this, in addition to the at least one actuated actuator, a further component of the hydraulic motor vehicle brake system which is capable of control interventions can participate in the control intervention, with the result that the at least one actuator takes part in the control intervention in an assisting manner. In the case of a merely partial functional loss of the corresponding brake circuit, a component of this type can be, for example, the first and/or the second (or a third) hydraulic pressure generator.

A hydraulic motor vehicle brake system in accordance with a second aspect comprises a vehicle dynamic control (Electronic Stability Control, ESC) system which is of dual-circuit configuration and which comprises a first brake circuit which acts on one or more first wheel brakes, and a second brake circuit which acts on one or more second wheel brakes, the first brake circuit comprising a first hydraulic pressure generator which can be actuated electrically for control interventions, and the second brake circuit comprising a second hydraulic pressure generator which can be actuated electrically for control interventions and which can be actuated independently of the first hydraulic pressure generator. Furthermore the hydraulic motor vehicle brake system comprises an electrically actuable third hydraulic pressure generator which is configured to generate a hydraulic pressure for at least one of the two brake circuits, and a controller which is configured to detect a functional loss of at least one of the two brake circuits and a requirement of a control invention on the at least one brake circuit which is affected by the functional loss, and, if the functional loss and the requirement of a control intervention are detected, to actuate at least the third hydraulic pressure generator, for carrying out or assisting the control intervention.

In one variant of the first or second aspect, the functional loss of the at least one brake circuit is detected as the requirement of a control intervention on the at least one brake circuit which is affected by the functional loss. In accordance with another variant, the requirement of a control intervention is detected at a separate time from the detection of the functional loss of the at least one brake circuit, for example at a later time. In said variant, the actuation of at least one of the actuators for carrying out or assisting the control intervention can take place immediately when the requirement of a control intervention is detected following the detection of the functional loss of the at least one brake circuit.

Exemplary control interventions comprise one or more of the following interventions: an anti-lock brake control operation, a traction control operation a vehicle dynamics control operation in the relatively strict sense (for example, for preventing oversteer or understeer), and a brake pressure control operation for an automatic distance control operation.

A hydraulic; motor vehicle brake system in accordance with a third aspect comprises a vehicle dynamic control (Electronic Stability Control ESC) system which is of dual-circuit configuration and which comprises a first brake circuit which acts on one or more first wheel brakes, and a second brake circuit which acts on one or more second wheel brakes, the first brake circuit comprising a first hydraulic pressure generator which can be actuated electrically for control interventions, and the second brake circuit comprising a second hydraulic pressure generator which can be actuated electrically for control interventions and which can be actuated independently of the first hydraulic pressure generator. Furthermore, the hydraulic motor vehicle brake system comprises an electrically actuable third hydraulic pressure generator which is configured to generate a hydraulic pressure for at least one of the two brake circuits, and a controller which is configured to detect a functional loss of the third hydraulic pressure generator and a driver's braking request, and, if the functional loss of the third hydraulic pressure generator and the driver's braking request are detected, to actuate the first hydraulic pressure generator and/or the second hydraulic pressure generator, in order to generate a hydraulic pressure in at least one of the brake circuits in accordance with the driver's braking request.

Furthermore, the hydraulic motor vehicle brake system in accordance with the second or third aspect may comprise an electric parking brake (EPB) system with an electrically actuable first actuator which is assigned to one of the first wheel brakes, and an electrically actuable second actuator which is assigned to one of the second wheel brakes. In this case, the controller in accordance with the second aspect can be configured, if the functional loss of at least one of the two brake circuits and the requirement of a control intervention are detected, to actuate at least one of the actuators, in order to carry out or assist the control intervention. The controller in accordance with the third aspect can be configured, if the functional loss of the third hydraulic pressure generator and the driver's braking request are detected, to actuate at least one of the actuators in accordance with the driver's braking request.

The following embodiments apply for the hydraulic motor vehicle brake system in accordance with all of the aspects which are proposed here. In one realization, the hydraulic motor vehicle brake system is configured as a Brake-By-Wire (BBW) system which comprises the third hydraulic pressure generator, and/or is equipped with an Electric Brake Boost (EBB) system which comprises the third hydraulic pressure generator. In one alternative refinement, the hydraulic motor vehicle brake system is provided with an electrically actuable vacuum brake booster which acts as the third hydraulic pressure generator.

The BBW system can provide permanent mechanical decoupling of a brake pedal from a master cylinder of the hydraulic motor vehicle brake system. Said mechanical decoupling can be canceled in favor of a mechanical intervention (this is also called push through, PT) in the case of a fault in the BBW system.

It is possible for the EBB system or the electrically actuable vacuum brake booster not to provide mechanical decoupling of this type, or to provide it only in certain cases (for example, in the case of a regenerative braking operation), a force which acts on the master cylinder by means of the brake pedal being boosted with the use of the third hydraulic pressure generator in the case of the mechanical coupling. For this purpose, the third hydraulic pressure generator may comprise the master cylinder and an electromechanical actuator which acts mechanically on the master cylinder in addition to the brake pedal. As an alternative to this, the third hydraulic pressure generator may comprise a separate cylinder/piston arrangement which is coupled hydraulically to the master cylinder or the brake circuits, and an electromechanical actuator which acts on the cylinder/piston arrangement. The first actuator and the second actuator of the EPB system can be electrically actuated independently of one another. The actuators can be based on an electromechanical, an electropneumatic, or an electrohydraulic principle.

A first sensor for detecting a hydraulic pressure in the first brake circuit and a second sensor for detecting a hydraulic pressure in the second brake circuit can be provided. A signal of the first sensor can form a basis for the actuation of the first hydraulic pressure generator and/or the first actuator. A signal of the second sensor can form a basis for the actuation of the second hydraulic pressure generator and/or the second actuator. The first brake circuit and the second brake circuit can be of identical construction. The identical construction can relate, in particular, to the electrically actuable and/or hydraulically active components which are installed in the brake circuits.

The hydraulic motor vehicle brake system may comprise a first electric supply system which is configured to supply the first hydraulic pressure generator and/or the first actuator. In addition or as an alternative to this, the hydraulic motor vehicle brake system may comprise a second electric; supply system which is configured to supply the second hydraulic pressure generator and/or the second actuator. Each supply system can be assigned separate electric lines and a separate voltage source. Furthermore, the first electric supply system can be configured to supply the second hydraulic pressure generator and/or the second actuator. As an alternative or In addition to this, the second electric supply system can be configured to supply the first hydraulic pressure generator and/or the first actuator. Furthermore, the first electric supply system and/or the second electric supply system can be configured to supply the third hydraulic pressure generator.

At least one of the hydraulic pressure generators, in particular the first and/or the second and/or the third hydraulic pressure generator, can be configured as a motor/pump unit. This embodiment comprises, for example, a double-acting cylinder/piston arrangement which can be actuated by means of an electric motor (for example, in the manner of a plunger arrangement), a single-acting cylinder/piston arrangement (for example, in the manner of a plunger arrangement), a gear pump or a radial or axial piston pump.

In accordance with a fourth aspect, an electronic control unit system for the hydraulic motor vehicle brake system which is proposed here in accordance with the first, second or third aspect is specified. The electronic control unit system comprises a first control unit which is configured to actuate the first hydraulic pressure generator and the first actuator, and a second control unit which is configured to actuate the second hydraulic pressure generator and the second actuator. Furthermore, the electronic control unit system may comprise a third control unit which is configured to actuate the third hydraulic pressure generator. As an alternative to this, the first and/or the second control unit can be configured to actuate the third hydraulic pressure generator.

An electronic control unit system in accordance with a fifth aspect for the hydraulic motor vehicle brake system which is proposed here in accordance with the third aspect comprises a first control unit which is configured to actuate the first hydraulic pressure generator, a second control unit which is configured to actuate the second hydraulic pressure generator, and a third control unit which is configured to actuate the third hydraulic pressure generator.

If an EPB system is present, the first control unit of the system in accordance with the fifth aspect can be configured to actuate the first actuator, and the second control unit can be configured to actuate the second actuator. The following embodiments apply to the control unit system in accordance with the fourth aspect or in accordance with the fifth aspect.

In one variant, the first control unit is configured to be operated on the first electric supply system and/or on the second electric supply system. As an alternative or in addition to this, the second control unit is configured to be operated on the first electric supply system and/or on the second electric supply system. As an alternative or in addition to this, the third control unit is configured to be operated on the first electric supply system and/or on the second electric supply system. This increases the redundancy and availability of the system. For example, the control units are operated in parallel on the first electric supply system and on the second electric supply system. At least two of the control units (for example, the first control unit and the second control unit) can be configured to communicate with one another via a first communication system and a second communication system. This increases the redundancy and availability of the system. For example, the control units communicate in parallel via the first communication system and the second communication system.

The first control unit and the second control unit can form a spatially contiguous control unit assembly. For example, the two control units can be installed in a common housing or in separate housings which, however, are in turn mounted on the same component (for example, a hydraulic assembly). The first control unit may comprise at least one first processor, and the second control unit may comprise at least one second processor. The at least one first processor can be provided to actuate the first hydraulic pressure generator and the first actuator. The at least one second processor can be provided to actuate the second hydraulic pressure generator and the second actuator. The third control unit may comprise at least one third processor. The at least one first processor and the at least one second processor (and optionally the third processor) can be connected to one another communicatively via a processor interface. The processor communication may comprise the exchange and/or the plausibility check of actuating signals or measured variables (for example, of sensor data of the above-addressed hydraulic pressure sensors or other sensors).

In accordance with a sixth aspect, a method for operating a hydraulic motor vehicle brake system with an Electronic Stability Control (ESC) system and an Electric Parking Brake (EPB) system is specified, the ESC system being of dual-circuit configuration and comprising a first brake circuit which acts on one or more first wheel brakes, and a second brake circuit which acts on one or more second wheel brakes, the first brake circuit comprising a first hydraulic pressure generator which can be actuated electrically for control interventions, and the second brake circuit comprising a second hydraulic pressure generator which can be actuated electrically for control interventions and which can be actuated independently of the first hydraulic pressure generator, and the EPB system comprising an electrically actuable first actuator which is assigned to one of the first wheel brakes, and an electrically actuable second actuator which is assigned to one of the second wheel brakes. The method comprises the steps of detecting of a functional loss of at least one of the two brake circuits and of a requirement of a control intervention on the at least one brake circuit which is affected by the functional loss, and actuating, if the functional loss and the requirement of a control intervention are detected, of at least one of the actuators for carrying out or assisting the control intervention.

In accordance with a seventh aspect, a method for operating a hydraulic motor vehicle brake system with a vehicle dynamic control (Electronic Stability Control, ESC) system is specified, which is of dual-circuit configuration and which comprises a first brake circuit which acts on one or more first wheel brakes, and a second brake circuit which acts on one or more second wheel brakes, the first brake circuit comprising a first hydraulic pressure generator which can be actuated electrically for control interventions, and the second brake circuit comprising a second hydraulic pressure generator which can be actuated electrically for control interventions and which can be actuated independently of the first hydraulic pressure generator, and the brake system comprising, furthermore, an electrically actuable third hydraulic pressure generator which is configured to generate a hydraulic pressure for at least one of the two brake circuits. The method comprises the steps of detecting of a functional loss of at least one of the two brake circuits and a requirement of a control intervention on the at least one brake circuit which is affected by the functional loss, and actuating, if the functional loss and the requirement of a control intervention are detected, of the third hydraulic pressure generator for carrying out or assisting the control intervention.

The following embodiments apply to the method in accordance with the sixth aspect or seventh aspect. An emergency braking operation can be carded out if the functional loss is detected or at a later time, for example in order to bring the vehicle to a standstill as rapidly as possible. In this case, the control intervention can take place within the context of the emergency braking operation, for example in order to maintain the vehicle stability during the emergency braking operation. Locking of a braked wheel can be detected as a requirement of a control intervention, the control intervention counteracting the locking of the braked wheel. As an alternative or in addition to this, a vehicle dynamics control operation can be detected as a requirement of a control intervention, the control intervention serving for the vehicle dynamics control operation.

As stated above, furthermore, the hydraulic motor vehicle brake system may comprise an electrically actuable third hydraulic pressure generator which is configured to generate a hydraulic pressure for at least one of the two brake circuits. In this case, furthermore, the method may comprise actuating of the third hydraulic pressure generator, if the functional loss and the requirement of a control intervention are detected, namely in order to carry out or assist the control intervention. At least one of the following events can be detected as a functional loss of at least one of the two brake circuits: a functional loss of the first and/or second and/or third hydraulic pressure generator, a functional loss of a control unit which is assigned to the first and/or second and/or third hydraulic pressure generator, and a leak of at least one of the brake circuits.

In accordance with an eighth aspect, a method for operating a hydraulic motor vehicle brake system with a vehicle dynamic control (Electronic Stability Control, ESC) system is specified, which is of dual-circuit configuration and which comprises a first brake circuit which acts on one or more first wheel brakes, and a second brake circuit which acts on one or more second wheel brakes, the first brake circuit comprising a first hydraulic pressure generator which can be actuated electrically for control interventions, and the second brake circuit comprising a second hydraulic pressure generator which can be actuated electrically for control interventions and which can be actuated independently of the first hydraulic pressure generator, the hydraulic motor vehicle brake system comprising, furthermore, an electrically actuable third hydraulic pressure generator which is configured to generate a hydraulic pressure for at least one of the two brake circuits. The method comprises the steps of detecting a functional loss of the third hydraulic pressure generator and of a driver's braking request, and actuating, if the functional loss of the third hydraulic; pressure generator and the driver's braking request are detected, of the first hydraulic pressure generator and/or of the second hydraulic pressure generator, in order to generate a hydraulic pressure in at least one of the brake circuits in accordance with the driver's braking request.

Furthermore, a computer program is specified which comprises program code for carrying out the method which is proposed here in accordance with the sixth, seventh or eighth aspect when the computer program runs on a processor (that is to say, within a motor vehicle control unit). A motor vehicle control unit or control unit system (comprising a plurality of control units) is likewise specified, the control unit or control unit system having at least one processor and at least one memory, and the at least one memory comprising program code which, when it is carried out by the at least one processor, brings about the performance of the steps of the method which is specified here.

BRIEF DESCRIPTION OF THE DRAWINGS

Further aspects, details and advantages of the present disclosure result from the following description of exemplary embodiments with reference to the figures, in which.

DETAILED DESCRIPTION

Figure 1:
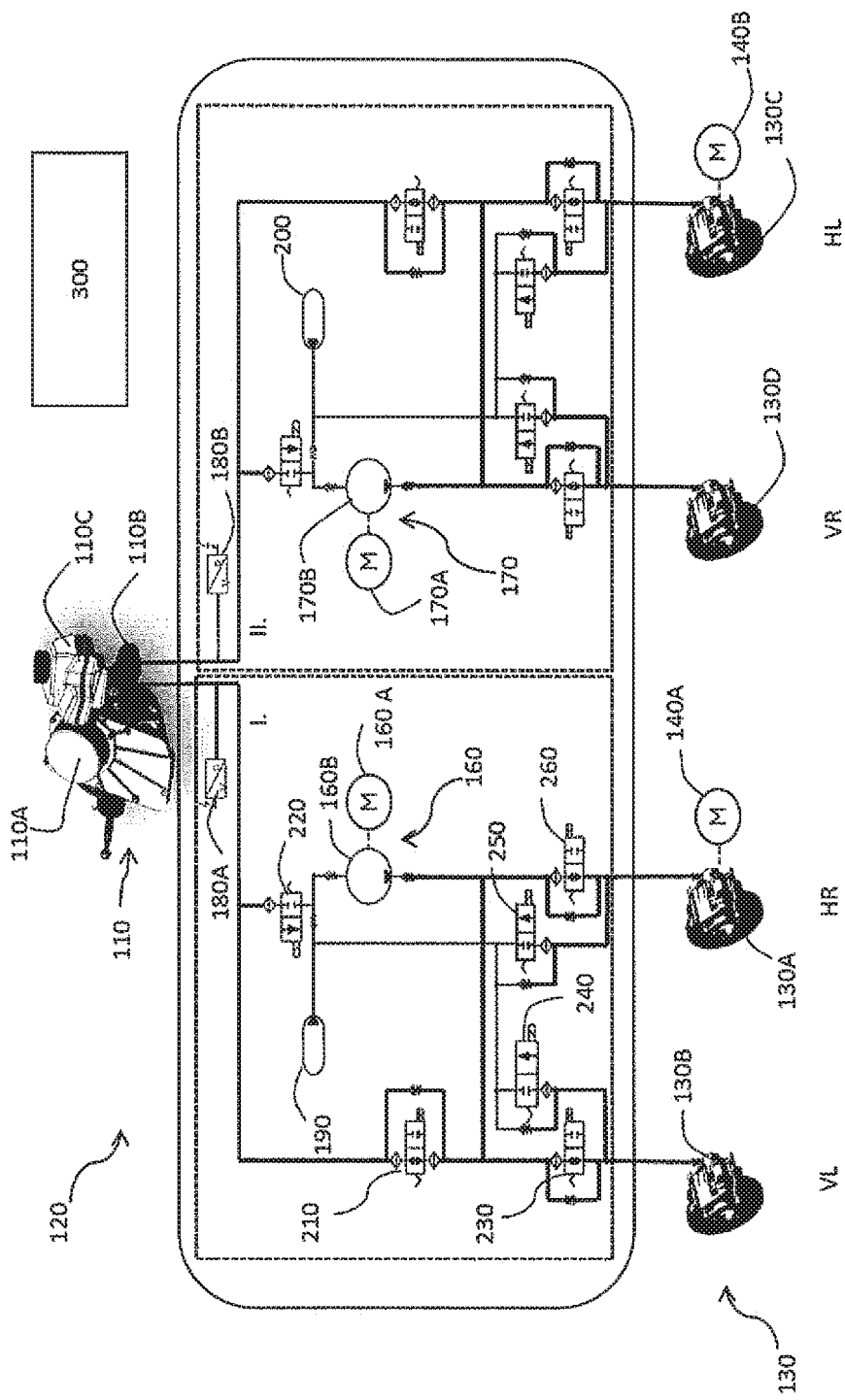
FIG. 1 shows an exemplary embodiment of a hydraulic motor vehicle brake system.

FIG. 1 shows the hydraulic circuit diagram of an exemplary embodiment of a hydraulic motor vehicle brake system 100. The hydraulic motor vehicle brake system 100 comprises an assembly 110 for hydraulic pressure generation which can be coupled to a brake pedal (not shown), and a hydraulic control assembly 120 (also called a hydraulic control unit, HCU) with two separate brake circuits I. and II. Furthermore, the hydraulic motor vehicle brake system 100 comprises four wheel brakes 130. Two of the four wheel brakes 130 are assigned to the brake circuit I., whereas the two other of the four wheel brakes 130 are assigned to the brake circuit II. The assignment of the wheel brakes 130 to the brake circuits I. and II. takes place in accordance with a diagonal division in such a way that the wheel brakes 130A and 130B on the right-hand rear wheel (HR) and on the left-hand front wheel (VL), respectively, are assigned to the brake circuit I., whereas the wheel brakes 130C and 130D on the left-hand rear wheel (HL) and on the right-hand front wheel (VR), respectively, are assigned to the brake circuit II. Any other division of the wheel brakes 130 to the brake circuits I. and II. would likewise be conceivable.

Furthermore, the hydraulic motor vehicle brake system 100 has an Electric Parking Brake (EPB) system with two electromechanical actuators 140A, 140B which can be actuated electrically separately from one another. In FIG. 1, the actuators 140A, 140B are indicated in each case merely in the form of an electric motor. It goes without saying that the actuators 140A, 140B comprise components, such as a gear mechanism, via which the actuators 140A, 140B act, for example, on wheel brake cylinders.

The two actuators 140A, 140B are assigned to different ones of the four wheel brakes 130. Specifically, the actuator 140A is assigned to the wheel brake 130A of the right-hand rear wheel (HR), whereas the actuator 140B is assigned to the wheel brake 130C of the left-hand rear wheel (HL). In other variants, the two actuators could of course also be assigned to the wheel brakes 130B and 130D of the left-hand front wheel (VL) and of the right-hand front wheel (VR), respectively.

The assembly 110 for hydraulic pressure generation comprises a master cylinder 110B and can be operated in accordance with an Electric Brake Booster (EBB) principle and/or a Brake-By-Wire (BBW) principle. This means that an electrically actuable hydraulic pressure generator is installed in the assembly 110, which hydraulic pressure generator is configured to generate a hydraulic pressure for at least one of the two brake circuits I. and II. Said hydraulic pressure generator comprises an electric motor 110A which acts directly or indirectly on the master cylinder 110B via a mechanical gear mechanism (not denoted) for the hydraulic pressure generation. An indirect action can take place, for example, in a hydraulic way (for instance by the gear mechanism acting on a plunger arrangement, the output of which is coupled hydraulically to an input of the master cylinder 110B). In the following text, the hydraulic pressure generator which is installed in the assembly 110 is denoted in general by way of the designation 110B.

The HCU 120 comprises an Electronic Stability Control (ESC) system of a dual-circuit configuration for carrying out control interventions on the wheel brakes 130. Specifically, the ESC system comprises a first electrically actuable hydraulic pressure generator 160 in the first brake circuit I. and a second electrically actuable hydraulic pressure generator 170 in the second brake circuit II. Each of the two hydraulic pressure generators 160, 170 comprises an electric motor 160A, 170A and a pump 160B, 170B which can be actuated by the electric motor 160A, 170A. Each of the two pumps 160B, 170B can be configured as a multiple piston pump, as a gear pump or in some other way. Each pump 160B, 170B shuts off counter to its delivery direction, as shown on the basis of the shut-off valves at the output and input of the pumps 160B, 170B. Since the rotational speed of each of the electric motors 160A, 170A can be set, the delivery quantity of each of the pumps 160B, 170B can also be set by way of corresponding actuation of the associated electric motor 160A, 170A.

The two electric motors 160A, 170A (and therefore the two hydraulic pressure generators 160, 170) can be actuated independently of one another. This means that each of the two hydraulic pressure generators 160, 170 can build up a hydraulic pressure in the respective brake circuit I. and II. independently of the other hydraulic pressure generator 170 or 160. This redundancy is advantageous for considerations relating to safety technology.

The hydraulic motor vehicle brake system 100 operates by means of a hydraulic fluid which is stored partially in three reservoirs 110C, 190, 200. Whereas the reservoir 110C is a pressureless reservoir which forms a part of the assembly 110, the other two reservoirs 190, 200 are installed in each case as pressure accumulators (for example, as a low pressure accumulator, LPA) in one of the two brake circuits I. and II. The two hydraulic pressure generators 160, 170 in each case are capable of sucking in hydraulic fluid from the associated reservoir 190 or 200 or from the reservoir 110C.

The reservoir 110C has a larger capacity than each of the two reservoirs 190, 200. The volume of the hydraulic fluid which is stored in each case in the two reservoirs 190, 200 is at least sufficient, however, for it to be possible for a vehicle to be brought safely to a standstill even in the case of a required brake pressure control operation on one or more of the wheel brakes 130 (for example, in the case of an emergency braking operation).

The first brake circuit I. comprises a hydraulic pressure sensor 180A which is arranged on the input side of the first brake circuit I. in the region of its interface with the assembly 110. The signal of the hydraulic pressure sensor 180A can be evaluated in conjunction with an actuation of the hydraulic pressure generator 116E which is installed in the assembly 110 and/or of the hydraulic pressure generator 160 which is installed in the first brake circuit I. The evaluation and actuation take place by means of a control unit system 300 (shown merely diagrammatically in FIG. 1). In a corresponding way, a further hydraulic pressure sensor 180B is installed in the second brake circuit II.

As shown in FIG. 1, the two brake circuits I. and II. are of identical construction in relation to the components which are installed therein and in relation to the arrangement of said components. For this reason, only the construction and the method of operation of the first brake circuit I. will be described in greater detail in the following text.

A plurality of valves which can be actuated by way of electromagnets are provided in the first brake circuit I., which assume the basic positions which are shown in FIG. 1 in the non-actuated, that is to say electrically non-actuated state. In said basic positions, the plurality of valves couples the assembly 110, in particular the master cylinder 110B, to the wheel brakes 130. A hydraulic pressure can thus still be built up at the wheel brakes 130 by the driver by means of the brake pedal which acts on the master cylinder 110B, even in the case of a functional loss (for example, a failure) of the energy supply and an associated failure of the hydraulic pressure generator 110B. This hydraulic pressure is then not boosted, however, in the case of an EBB implementation, or mechanical coupling of the brake pedal to the master cylinder 110B then takes place in the case of a BBW implementation (push through, PT, operation). In the BBW operation, in contrast, the master cylinder 110B is decoupled fluidically from the first brake circuit I. in a known way.

The multiplicity of valves comprises two 2/2-way valves 210, 220 which permit decoupling of the two wheel brakes 130A and 130B from the assembly 110. Specifically, the valve 210 is provided to decouple the wheel brakes 130A, 130B from the assembly 110 in the electrically actuated state if a control intervention is carried out on at least one of the two wheel brakes 130A, 130B by means of the hydraulic pressure generator 160. In its electrically actuated state, the valve 220 makes it possible that hydraulic fluid can be sucked in or replenished from the reservoir 110C (for example, in the case of a control intervention of long duration if the reservoir 100 is emptied completely in the process). Furthermore, in said electrically actuated state, a pressure reduction is possible at the wheel brakes 130A, 130B, by a return flow of hydraulic fluid from the wheel brakes 130A, 130B into the pressureless reservoir 110C being made possible.

The hydraulic connection of the wheel brakes 130A, 130B to the assembly 110 and the hydraulic pressure generator 160 is determined by four 2/2-way valves 230, 240, 250, 260 which assume the basic positions which are shown in FIG. 1 in the non-actuated, that is to say electrically non-actuated state. This means that the two valves 230 and 260 in each case assume their throughflow position, whereas the two valves 240 and 250 in each case assume their shut-off position. The two valves 230 and 240 form a first valve arrangement which is assigned to the wheel brake 130B, whereas the two valves 250 and 260 form a second valve arrangement which is assigned to the wheel brake 130A.

As will be described in the following text, the two valves 210 and 220, the two valve arrangements 230, 240 or 250, 260, and the hydraulic pressure generator 160 are configured in each case to be actuated for wheel brake pressure control interventions at the respective wheel brake 130A, 130B. The actuation of the two valves 210 and 220, of the two valve arrangements 230, 240 or 250, 260, and of the hydraulic pressure generator 160 within the context of the control interventions takes place by means of the control unit system 300. For example, the control unit system 300 implements the wheel brake pressure control interventions of a vehicle dynamics control system (for example, of an Electronic Stability Control, ESC), the vehicle dynamics control system in accordance with the present disclosure also comprising an anti-lock brake system (ABS), a traction control system (TCS) and a brake pressure control system for an adaptive speed control system (adaptive cruise control, ACC).

In the case of an anti-lock brake control operation, the aim is to prevent locking of the wheels during braking operation. To this end, it is necessary to modulate the hydraulic pressure in the wheel brakes 130A, 130B individually. This takes place by way of setting in a temporal sequence of changing pressure build-up, pressure holding and pressure reduction phases which result from suitable actuation of the valve arrangements 230, 240 and 250, 260 which are assigned to the two wheel brakes 130B and 130A, respectively, and optionally of the hydraulic pressure generator 160.

During a pressure build-up phase, the valve arrangements 230, 240 or 250, 260 in each case assume their basic; position, with the result that an increase in the brake pressure in the wheel brakes 130A, 130B can take place by means of the hydraulic pressure generator 160 (as in the case of a BBW braking operation). For a pressure holding phase on one of the wheel brakes 130B and 130A, only the valve 230 or 260 is actuated, that is to say is transferred into its shut-off position. Since an actuation of the valve 240 or 250 does not take place here, a remains in its shut-off position. As a result, the corresponding wheel brake 130B or 130A is decoupled hydraulically, with the result that a hydraulic pressure remains constant within in the wheel brake 130B or 130A is kept constant. In the case of a pressure reduction phase, both the valve 230 or 260 and the valve 240 or 250 are actuated, that is to say the valve 230 or 260 transfers into its shut-off position and the valve 240 or 250 transfers into its through-flow position. In this way, hydraulic fluid can flow out of the wheel brake 130B or 130A in the direction of the reservoir 110C and 190, in order to reduce a hydraulic pressure within the wheel brake 130A or 130B.

Other control interventions in normal braking operation take place in an automated manner and typically independently of an actuation of the brake pedal by way of the driver. Automated control operations of this type of the wheel brake pressure take place, for example, in conjunction with a traction control system which prevents individual wheels spinning during a starting operation by way of targeted braking, in conjunction with a driving dynamics control operation in the relatively strict sense which adapts the vehicle behavior near the limit to the driver's request and the roadway conditions by way of targeted braking of individual wheels, or in conjunction with an adaptive speed control operation which maintains a distance of the vehicle from a preceding vehicle by way of automatic braking.

In the case of an automatic hydraulic pressure control operation being carried out, a hydraulic pressure can be built up at at least one of the wheel brakes 130A or 130B by way of actuation of the hydraulic pressure generator 160. Here, the valve arrangements 230, 240 or 250, 260 which are assigned to the hydraulic pressure generator 160 of the wheel brakes 130B, 130A first of all assume their basic positions which are illustrated in FIG. 1. A precision adjustment or modulation of the hydraulic pressure can be performed by way of corresponding actuation of the hydraulic pressure generator 160 and of the valves 230, 240 and 250, 260 which are assigned to the wheel brakes 130B and 130A, respectively, as has been described above by way of example in conjunction with the ABS control operation.

The hydraulic pressure control operation takes place by means of the control unit system 300, generally in a manner which is dependent firstly on the measured variables which describe the vehicle behavior (for example, wheel speeds, yaw speed, transverse acceleration, etc.) and secondly on the measured variables which describe the driver's request (for example, actuation of the brake pedal, steering wheel angle, etc.). A deceleration request of the driver can be determined, for example, by means of a displacement sensor which is coupled to the brake pedal or an input member of the master cylinder 110B. As an alternative or in addition to this, the brake pressure which is generated in the master cylinder 110B by the driver can be used as the measured variable which describes the driver's request, which brake pressure is then detected and possibly subjected to a plausibility check by means of the sensor 180A (and the corresponding sensor 180B which is assigned to the second brake circuit II.).

Figure 2:
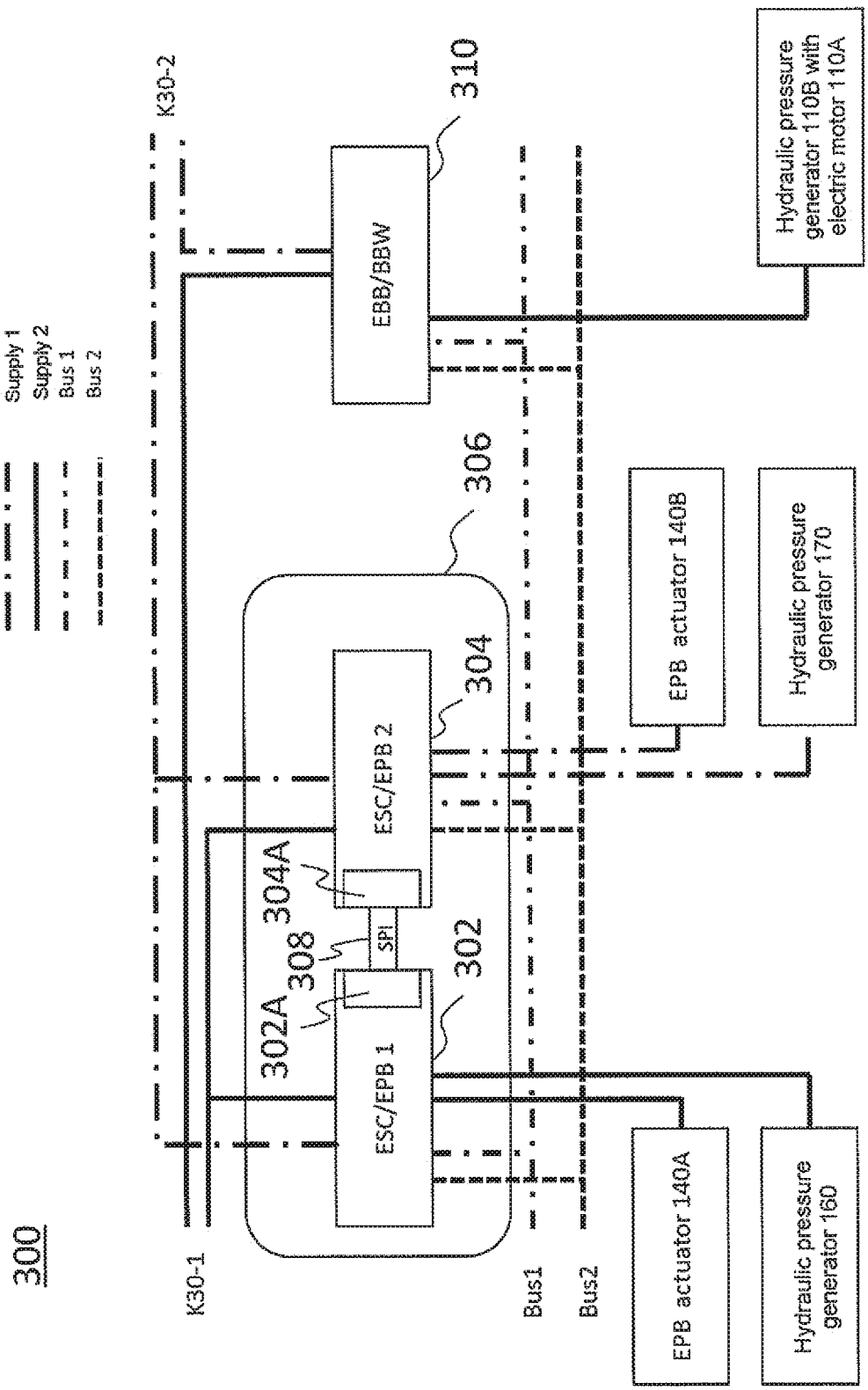
FIG. 2 shows an exemplary embodiment of a control unit system for the hydraulic motor vehicle brake system according to FIG. 1, FIGS. 3A/3B show flow charts of exemplary embodiments of methods for operating the hydraulic motor vehicle brake system according to FIG. 1.

FIG. 2 shows an exemplary embodiment of the control unit system 300. As illustrated in FIG. 2, the control unit system 300 comprises a first control unit 302 which is configured to actuate the hydraulic pressure generator 160 and the EPB actuator 140A, and a second control unit 304 which is configured to actuate the hydraulic pressure generator 170 and the EPB actuator 140B. As has been described in conjunction with FIG. 1, said actuation can take place on the basis of a plurality of measured variables which are detected by sensors.

In the exemplary embodiment according to FIG. 2, the two control units 302 and 304 are configured as a spatially contiguous control unit assembly 306. For instance, the two control units 302 and 304 can be accommodated in a common housing, but may comprise separate processors 302A, 304A for processing the measured variables and for actuating the respective associated components 140A, 160 and 140B, 170, respectively. For data exchange, for example in conjunction with the plausibility check of measured variables and/or actuating signals, the corresponding processors 302A, 304A of the two control units 302, 304 are connected communicatively to one another via a processor interface 308. In the exemplary embodiment, the processor interface 308 is configured as a serial-parallel interface (SPI).

Furthermore, the control unit system 300 comprises a third control unit 310 which is configured to actuate the hydraulic pressure generator 110B which is installed in the assembly 110, and therefore, in particular, to actuate its electric motor. Depending on the configuration of the hydraulic motor vehicle brake system 100, said actuation can take place in accordance with the EBB principle or the BBW principle. The third control unit 310 can form a spatially contiguous control unit assembly with the two other control units 302 and 304, or else can be provided spaced apart from said control units 302 and 304. In one realization, a housing of the third control unit 310 is integrated into the assembly 110.

As shown in FIG. 2, two parallel electric supply systems K30-1 and K30-2 are provided. Each one of said two electric; supply systems K30-1 and K30-2 comprises a voltage source and associated voltage supply lines. In the exemplary embodiment according to FIG. 2, the first electric supply system K30-1 is configured to supply the EPB actuator 140A and the hydraulic pressure generator 160, whereas the parallel electric supply system K30-2 is configured to supply the other EPB actuator 140B and the hydraulic pressure generator 170. In another exemplary embodiment the EPB actuator 140A and the hydraulic pressure generator 160 might additionally (that is to say, in a redundant way) be capable of being supplied by the second electric supply system K30-2, and the EPB actuator 140B and the hydraulic pressure generator 170 might additionally be capable of being supplied by the first electric supply system K30-1. In this way, the system redundancy is increased further.

Each of the three control units 302, 304, and 310 is supplied in a redundant way both via the first electric supply system K30-1 and also via the second electric supply system K30-2. For this purpose, each of the three control units 302, 304, and 310 can be provided with two separate supply connectors which are assigned to in each case one of the two electric supply systems K30-1 and K30-2.

As illustrated further in FIG. 2, two parallel communication systems Bus1 and Bus2 are provided in a redundant way, which communication systems are configured in the exemplary embodiment in each case as a vehicle bus (for example, in accordance with the CAN or LIN standard). The three control units 302, 304, and 310 can communicate with one another via each of said two communication systems Bus1 and Bus2.

In the exemplary embodiment according to FIG. 2, the actuation of the components 140A, 160 and 140B, 170 takes place by means of the two control units 302 and 304, and the actuation of the hydraulic pressure generator 110B which is installed in the assembly 110 takes place by means of the third control unit 310 in such a way that the corresponding control unit 302, 304, and 310 switches on or off and possibly modulates (for example, byway of pulse width modulation) the power supply for the corresponding component. In another exemplary embodiment, one or more of said components, in particular the EPB actuators 140A, 140B, can be connected to one or both of the communication systems Bus1, Bus2. In this case, the actuation of said components by means of the associated control unit 302, 304, and 310 then takes place via the corresponding communication system Bus1, Bus2. Furthermore, in this case, the corresponding component can be connected continuously to one or both of the electric supply systems K30-1, K30-2.

In the following text, one exemplary embodiment of a method for operating the hydraulic motor vehicle brake system 100 according to FIG. 1 will be described with reference to the flow chart 400 according to FIG. 3A. The method can be earned out by means of the control unit system 300 which is shown in FIG. 2 or a control unit system which is configured in some other way.

The method begins in step 402 with the detection of a functional loss of at least one of the brake circuits I., II. The functional loss can be detected by means of a sensor which is installed in the hydraulic motor vehicle brake system 100, for example the hydraulic pressure sensor 180A or 180B, or in some other way. For instance, a leak of the first brake circuit I. and an associated functional loss of the first brake circuit I. can be detected by virtue of the fact that the hydraulic pressure sensor 180A detects a pressure reduction. A functional loss of at least one of the two hydraulic pressure generators 160, 170 or of the control units 302, 304 which is assigned to the respective hydraulic pressure generator 160, 170 can also be detected as a functional loss of the corresponding brake circuit I., II. In the extreme case, the functional loss can lead to a complete failure of the corresponding brake circuit I., II.

In a further step 404, the requirement of a control intervention on the brake circuits I., II. which is affected by the functional loss is detected. Steps 402 and 404 can be carried out in any desired sequence and also at the same time. For instance, a brake circuit functional loss which is detected in step 402 can itself represent the requirement for a control intervention in accordance with step 404. In another implementation, the control intervention requirement in accordance with step 404 is different than the brake circuit functional loss which is detected in step 402. For instance, for example, locking of a braked wheel or the requirement of a control intervention in the relatively strict sense (cf., for example, the following FIG. 4) can be detected as a control intervention requirement in accordance with step 404. The corresponding locking of a braked wheel and/or the corresponding vehicle dynamics control requirement can occur in conjunction with an emergency braking operation. Said emergency braking operation can take place as a reaction to the brake circuit functional loss which is detected in step 402 or as a reaction to another event (for example, a directly imminent collision accident or a person entering the roadway).

If both brake circuit functional loss (step 402) and the requirement of a control intervention (step 404) have been detected, at least one of the EPB actuators 140A, 140B and/or the hydraulic pressure generator 110B which is installed in the assembly 110 are/is actuated in step 406, in order to carry out or to assist the control intervention. In the case of an assistance of the control intervention, in addition to the actuation of one or more of the abovementioned components, a further component is additionally actuated. Said further component can be, for example, the hydraulic pressure generator 160 if the hydraulic pressure generator 170 is affected by the brake circuit failure (or vice versa).

In the following text, a further exemplary embodiment of a method for operating the hydraulic motor vehicle brake system 100 according to FIG. 1 will be described with reference to the flow chart 500 according to FIG. 3B. The method can be carried out by means of the control unit system 300 which is shown in FIG. 2 or by means of a control unit system which is configured in some other way.

The method begins in step 502 with the detection of a functional loss of the hydraulic pressure generator 110B which is configured for an EBB implementation and/or BBW implementation. The functional loss can be detected by means of a sensor which is installed in the hydraulic motor vehicle brake system 100, for example the hydraulic pressure sensor 180A or 180B, or in some other way. The functional loss can be a failure of the electric motor 110A (including a failure of its electric supply) or of the third control unit 310. In a further step 504, a driver's braking request is detected. Said detection can be detected by means of a sensor which is installed on the brake pedal (for example, a displacement sensor). If both a functional loss (step 502) and the requirement of a drivers braking request (step 504) have been detected, at least one of the hydraulic pressure generators 160, 170 is actuated in accordance with the driver's braking request in step 506. Said actuation can serve for Electric Brake Boosting (EBB implementation) or brake force generation without a driver's force component (BBW implementation).

Figure 3A:
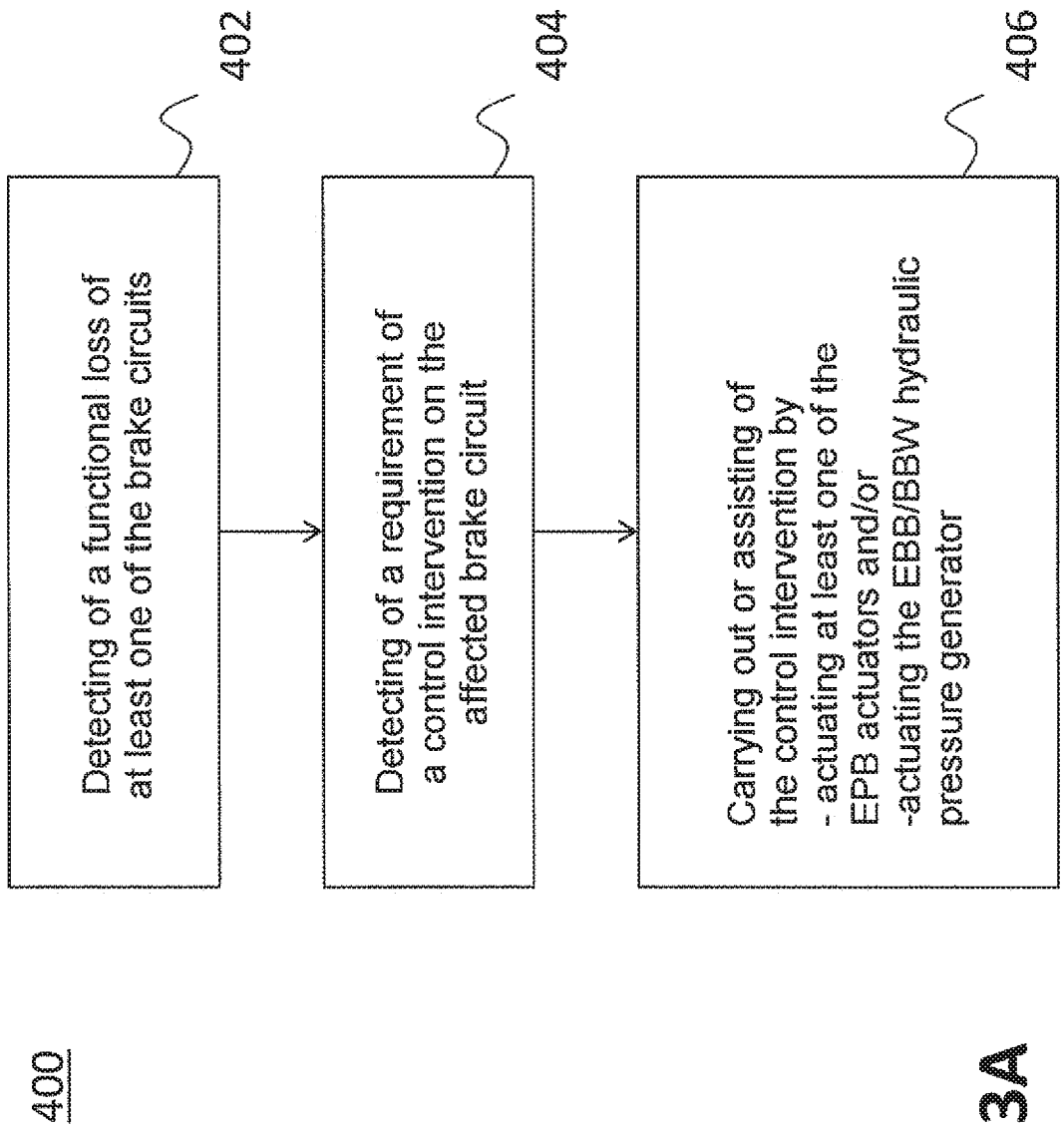
Figure 3B:
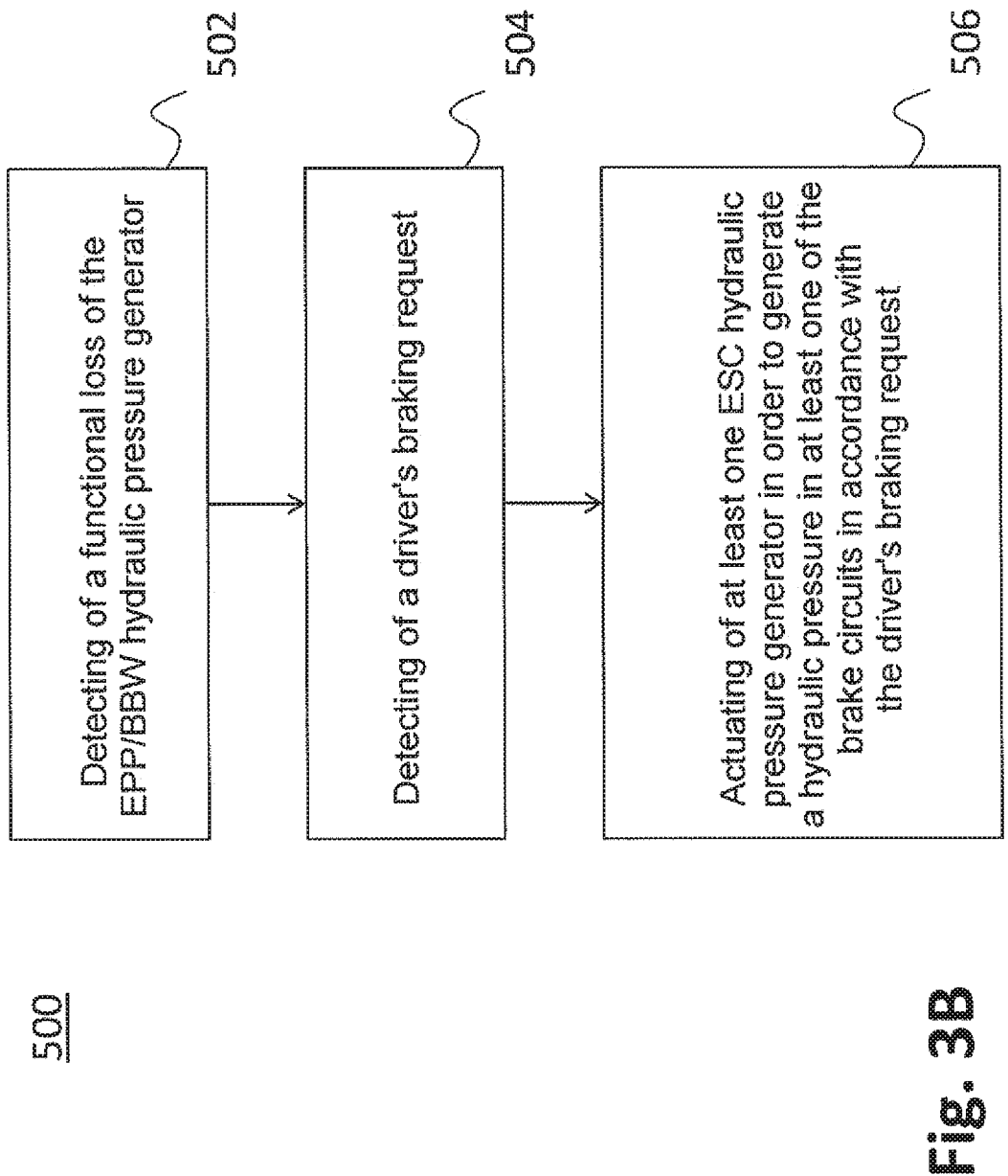

The actuating concept in accordance with step 406 from FIG. 3A or in accordance with step 506 from FIG. 3B and the redundancies which are illustrated in FIGS. 1 and 2 make it possible for a safety-relevant control intervention or a build-up of braking force to still be carried out even in the case of a functional loss of one of the brake circuits I., II. or of the hydraulic pressure generator 110B. This situation will be described in the following text for the scenario according to FIG. 3A, by way of example with reference to the diagrammatic illustration according to FIG. 4.

Figure 4:
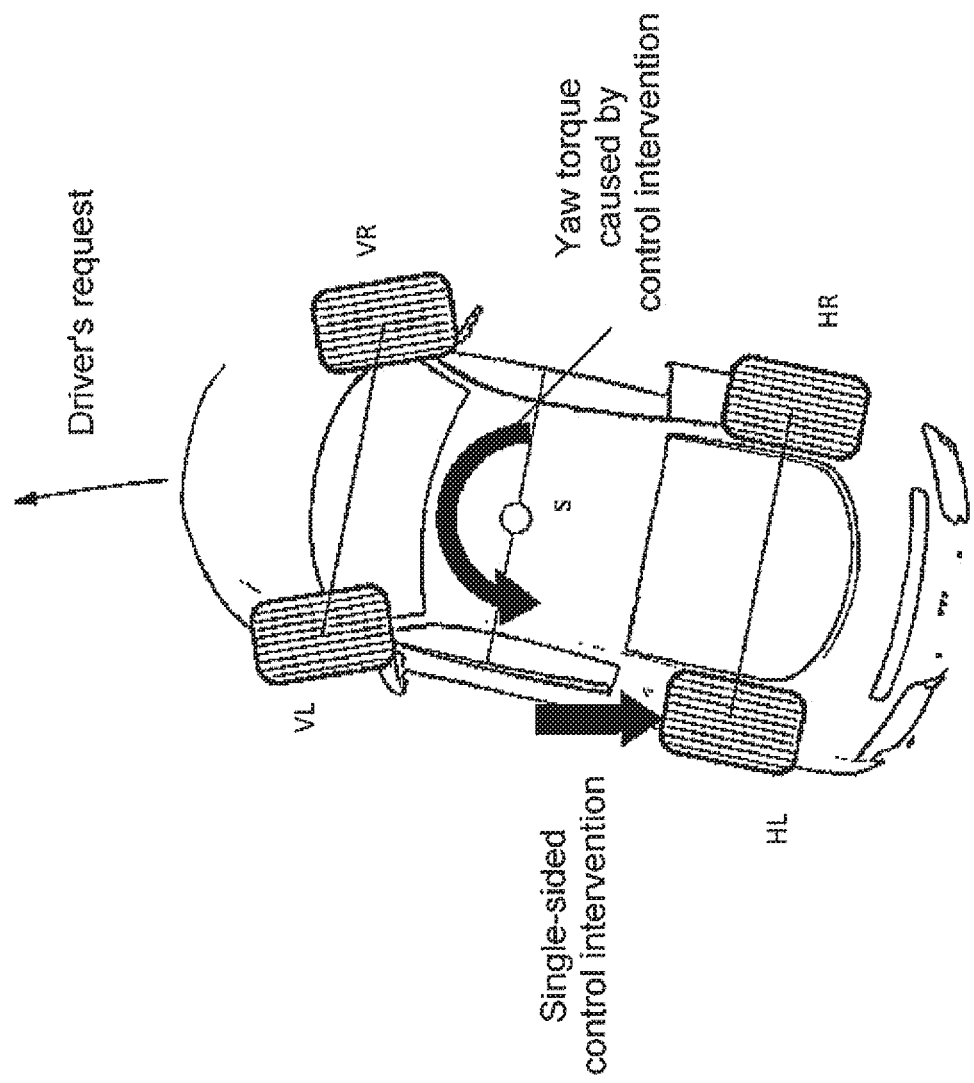
FIG. 4 shows a schematic diagram which illustrates a control intervention within the context of the method according to FIG. 3A.

FIG. 4 shows an assisting control intervention by way of the EPB actuator 140B in the case of a functional loss of the second brake circuit II. (for example, on account of a leak of a hydraulic line or a functional loss of the hydraulic pressure generator 170) in the case of an understeering vehicle. If the functional loss of the second brake circuit II. is accordingly detected in step 402 of the method which is illustrated in FIG. 3A and, furthermore, the requirement of a control intervention on account of understeering is detected in step 404, the EPB actuator 140B is actuated selectively by the second control unit 304 in step 406, in order to generate a yaw torque by means of a single-sided control intervention, which yaw torque counteracts the understeering.

It is to be noted that FIG. 4 illustrates merely an exemplary control intervention, and step 406 can also be carried out in conjunction with other control interventions. For instance, in the scenario according to FIG. 4, the hydraulic pressure generator 110B can be actuated in the same way in the case of a functional loss of the second brake circuit II. (for example, a functional loss of the hydraulic pressure generator 170), in order to carry out or assist the control intervention in step 406 according to FIG. 3A. To this end, the valves which are installed in the second brake circuit II. (cf. FIG. 1) are moved into a corresponding position, in order to make the single-sided control intervention (illustrated in FIG. 4) on the left-hand rear wheel possible. The corresponding actuation of the hydraulic pressure generator 110B can take place in addition or as an alternative to the above-described actuation of the EPB actuator 140B. The corresponding braking torques of the EPB actuator 140B and the hydraulic pressure generator 110B can therefore be superimposed in the case of control interventions of this type.

The three steps 402, 404 and 406 can be carded out by means of the second control unit 304. As an alternative to this, only step 406 can be carried out by way of the second control unit 304, whereas steps 402 and 404 are carded out by another control unit which signals to the control unit 406 that, for example, the EPB actuator 140B has to be actuated. In contrast, the other brake circuit I. is hydraulically functional, and can be used if required in addition for the longitudinal and/or transverse control of the vehicle. In this context, the corresponding braking torques can be superimposed. A corresponding actuation, for example, of the hydraulic pressure generator 160 can take place in this case by means of the first control unit 302.

The concepts which are described here can be implemented, in particular, in conjunction with highly automated (that is to say, autonomous or partially autonomous) driving, in order to comply with requirements relating to safety functions. For instance, in the case of highly automated driving in accordance with "Level 4", it is assumed that the driver is capable only after a certain waiting period of assuming control again of his/her vehicle himself/herself. If a fault occurs in the hydraulic motor vehicle brake system 100 within said waiting period, the technical teachings which are presented here make an improvement in the basic functionality possible in comparison with manual driving.

The invention claimed is:

1. A hydraulic motor vehicle brake system, comprising:
a vehicle dynamic control system which is of dual-circuit configuration and which comprises a first brake circuit which acts on one or more first wheel brakes, and a second brake circuit fluidly isolated from the first brake circuit which acts on one or more second wheel brakes different from the one or more first wheel brakes, the first brake circuit comprising a first hydraulic pressure generator which can be actuated electrically for control interventions, and the second brake circuit comprising a second hydraulic pressure generator which can be actuated electrically for control interventions and which can be actuated independently of the first hydraulic pressure generator;
a third hydraulic pressure generator independently electrically actuatable from the first and second hydraulic pressure generators which is configured to generate a hydraulic pressure for at least one of the two brake circuits; and
a controller which is configured:
to detect a functional loss of at least one of the two brake circuits and a requirement of a control intervention on the at least one brake circuit which is affected by the functional loss; and,
if the functional loss and the requirement of a control intervention are detected, to actuate at least the third hydraulic pressure generator for carrying out or assisting the control intervention.

2. The hydraulic motor vehicle brake system as defined in claim 1, further comprising, an Electric Parking Brake system with an electrically actuable first actuator which is assigned to one of the first wheel brakes, and an electrically actuable second actuator which is assigned to one of the second wheel brakes,
the controller being configured, if the functional loss of at least one of the two brake circuits and the requirement of a control intervention are detected, to actuate at least one of the actuators, in order to carry out or assist the control intervention, and, if the functional loss of the third hydraulic pressure generator and the driver's braking request are detected, to actuate it in accordance with the driver's braking request.

3. The hydraulic motor vehicle brake system as defined in claim 2, wherein the first actuator and the second actuator are electrically actuated independently of one another.

4. The hydraulic motor vehicle brake system as defined in claim 3, wherein the hydraulic motor vehicle brake system is configured as a brake-by-wire system which comprises the third hydraulic pressure generator, and being equipped with an Electric Brake Booster system which comprises the third hydraulic pressure generator.

5. The hydraulic motor vehicle brake system as defined in claim 3, comprising, furthermore, a first sensor for detecting a hydraulic pressure in the first brake circuit and a second sensor for detecting a hydraulic pressure in the second brake circuit being provided.

6. The hydraulic motor vehicle brake system as defined in claim 3, wherein the first brake circuit and the second brake circuit are of identical construction.

7. The hydraulic motor vehicle brake system as defined in claim 3, further comprising,
a first electric supply system which is configured to supply the first hydraulic pressure generator and the third hydraulic pressure generator;
a second electric supply system which is configured to supply the second hydraulic pressure generator and the third hydraulic pressure generator.

8. The hydraulic motor vehicle brake system as defined in claim 7, wherein the first electric supply system is configured, furthermore, to supply the second hydraulic pressure generator and the second electric supply system is configured, furthermore, to supply the first hydraulic pressure generator.

9. The hydraulic motor vehicle brake system as defined in claim 7, wherein at least one of the hydraulic pressure generators is configured as a motor/pump unit.

10. The hydraulic motor vehicle brake system as defined in claim 1, wherein the first and second hydraulic pressure generators are provided downstream of the third hydraulic pressure generator in a parallel relationship therewith.

11. A hydraulic motor vehicle brake system, comprising:
a vehicle dynamic control system which is of dual-circuit configuration and which comprises a first brake circuit which acts on one or more first wheel brakes, and a second brake circuit fluidly isolated from the first brake circuit which acts on one or more second wheel brakes different from the one or more first wheel brakes, the first brake circuit comprising a first hydraulic pressure generator which can be actuated electrically for control interventions, and the second brake circuit comprising a second hydraulic pressure generator which can be actuated electrically for control interventions and which can be actuated independently of the first hydraulic pressure generator;

a third hydraulic pressure generator independently electrically actuatable from the first and second hydraulic pressure generators which is configured to generate a hydraulic pressure for at least one of the two brake circuits; and a controller which is configured:
to detect a functional loss of the third hydraulic pressure generator and a driver's braking request; and,
if the functional loss of the third hydraulic pressure generator and the driver's braking request are detected, to actuate the first hydraulic pressure generator and the second hydraulic pressure generator, in order to generate a hydraulic pressure in at least one of the brake circuits in accordance with the driver's braking request.

12. A hydraulic motor vehicle brake system comprising:
a vehicle dynamic control system which is of dual-circuit configuration and which comprises a first brake circuit which acts on one or more first wheel brakes, and a second brake circuit fluidly isolated from the first brake circuit which acts on one or more second wheel brakes different from the one or more first wheel brakes, the first brake circuit comprising a first hydraulic pressure generator which can be actuated electrically for control interventions, and the second brake circuit comprising a second hydraulic pressure generator which can be actuated electrically for control interventions and which can be actuated independently of the first hydraulic pressure generator;

a third hydraulic pressure generator independently electrically actuatable from the first and second hydraulic pressure generators which is configured to generate a hydraulic pressure for at least one of the two brake circuits; and a controller which is configured:
to detect a functional loss of at least one of the two brake circuits and a requirement of a control intervention on the at least one brake circuit which is affected by the functional loss; and,
if the functional loss and the requirement of a control intervention are detected, to actuate at least the third hydraulic pressure generator for carrying out or assisting the control intervention;

a first control unit which is configured to actuate the first hydraulic pressure generator;
a second control unit which is configured to actuate the second hydraulic pressure generator; and
a third control unit which is configured to actuate the third hydraulic pressure generator.

13. The hydraulic motor vehicle brake system as defined in claim 12, wherein at least two of the control units are configured to communicate with one another via a first communication system and a second communication system.

14. The hydraulic motor vehicle brake as defined in claim 12, wherein the first control unit and the second control unit form a spatially contiguous control unit assembly.

15. The hydraulic motor vehicle brake as defined in claim 14, wherein the first control unit comprising a first processor and the second control unit comprising a second processor, the processors are connected to one another communicatively via a processor interface.

16. A method for operating a hydraulic motor vehicle brake system with a vehicle dynamic control system which is of dual-circuit configuration and which comprises a first brake circuit which acts on one or more first wheel brakes, and a second brake circuit which acts on one or more second wheel brakes, the first brake circuit comprising a first hydraulic pressure generator which can be actuated electrically for control interventions, and the second brake circuit comprising a second hydraulic pressure generator which can be actuated electrically for control interventions and which can be actuated independently of the first hydraulic pressure generator, and the hydraulic motor vehicle brake system comprising, furthermore, an electrically actuable third hydraulic pressure generator which is configured to generate a hydraulic pressure for at least one of the two brake circuits, the method comprising the steps of:

detecting of a functional loss of at least one of the two brake circuits and of a requirement of a control intervention on the at least one brake circuit which is affected by the functional loss; and actuating, if the functional loss and the requirement of a control intervention are detected, the third hydraulic pressure generator independently from the first and second hydraulic pressure generators for carrying out or assisting the control intervention.

17. The method as defined in claim 16, comprising, furthermore, an emergency braking operation being carried out if the functional loss is detected, and the control intervention taking place within the context of the emergency braking operation.

18. The method as defined in claim 16, further comprising the step of locking of a braked wheel being detected as a requirement of a control intervention, and the control intervention counteracting the locking of the braked wheel.

19. The method as defined in claim 16, further comprising, a vehicle dynamics control operation being detected as a requirement of a control intervention, and the control intervention serving for the vehicle dynamics control operation.

20. The method as defined in claim 16, wherein at least one of the following events being detected as a functional loss of at least one of the two brake circuits:
a functional loss of the first and second and third hydraulic pressure generator;
a functional loss of a control unit which is assigned to the first and second hydraulic pressure generator and of a control unit which is assigned to the third hydraulic pressure generator; and
a leak of at least one of the brake circuits.

* * * * *